United States Patent
Luebbers et al.

[15] 3,706,154
[45] Dec. 19, 1972

[54] FISHHOOK REMOVER

[72] Inventors: Earl H. Luebbers, 611 21st Street, Carlyle, Ill. 62231; Bertis N. Kingsley, Albers, Ill. 62215

[22] Filed: Feb. 16, 1971

[21] Appl. No.: 115,227

[52] U.S. Cl. ..................... 43/53.5, 81/177 F, 294/26
[51] Int. Cl. ............................................... A01k 97/00
[58] Field of Search ..... 43/53.5, 23, 137, 19; 294/26; 81/177 F

[56] References Cited

UNITED STATES PATENTS

| | | | |
|---|---|---|---|
| 479,032 | 7/1892 | Surbaugh | 81/177 F UX |
| 2,362,137 | 11/1944 | Kagan | 294/26 X |
| 2,289,767 | 7/1942 | Ford | 43/53.5 |
| 1,295,608 | 2/1919 | Schoen | 43/23 UX |
| 3,162,475 | 12/1964 | Van Allen | 294/26 |

Primary Examiner—Samuel Koren
Assistant Examiner—Daniel J. Leach
Attorney—Greist, Lockwood, Greenawalt & Dewey

[57] ABSTRACT

An improved fishhook remover producible on a mass production basis from relatively stiff wire stock so as to have a relatively stiff shank portion with a fishhook engaging hook formation on one end of the shank and a handle integrally formed on the opposite portion in the form of an elongated tightly coiled spring. The spring handle may be telescopically inserted within a grip member. The fishhook engaging hook portion may be either coplanar with the shank or in a plane approximately at right angles thereto.

4 Claims, 5 Drawing Figures

PATENTED DEC 19 1972    3,706,154
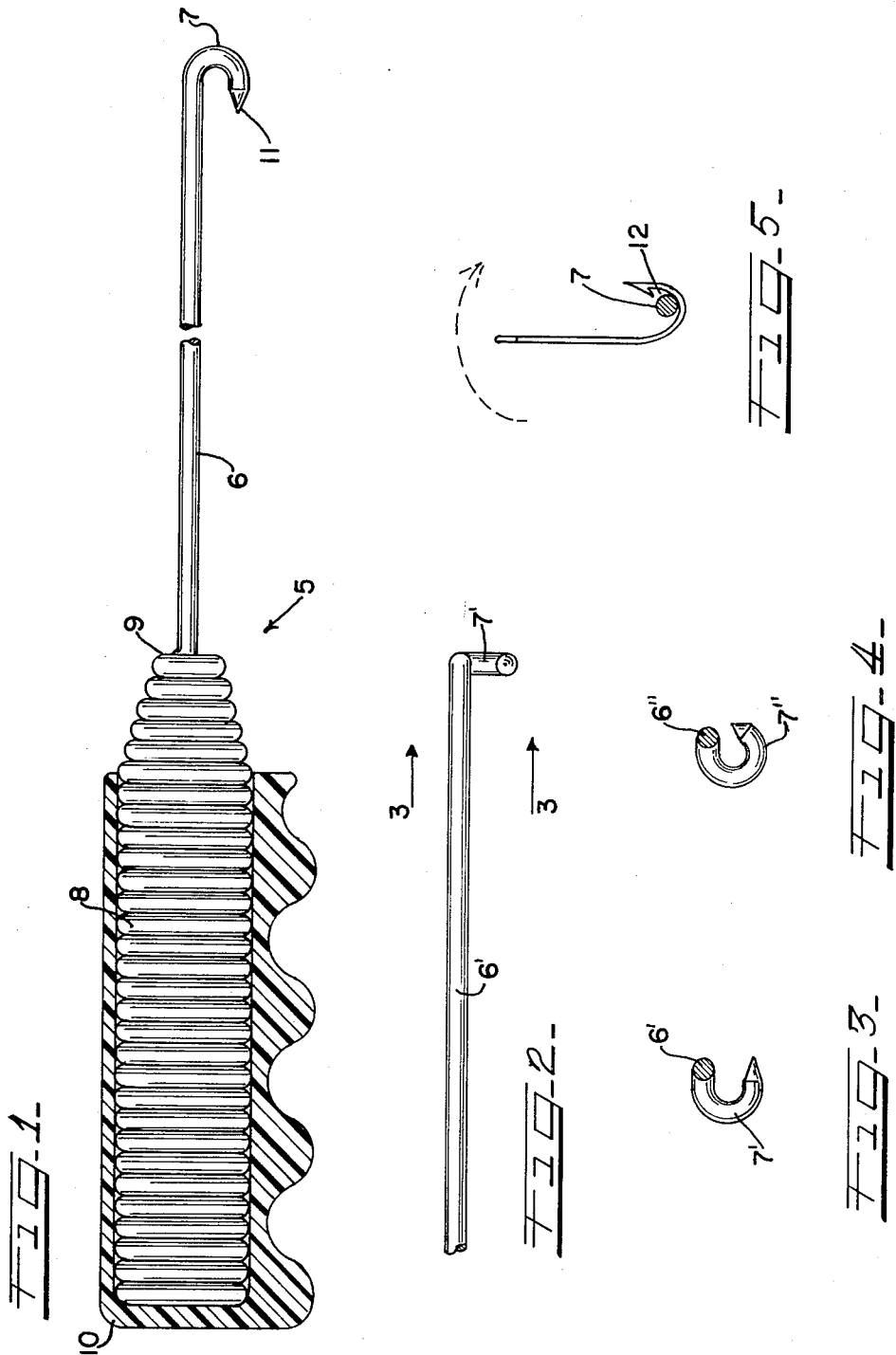
INVENTOR
EARL H. LUEBBERS
BERTIS N. KINGSLEY
BY Greist, Lockwood, Greenawalt & Dewey
ATT'YS

FISHHOOK REMOVER

The object of this invention, generally stated, is the provision of an improved fishhook remover which may be integrally formed on a mass production basis from relatively stiff wire stock and which has an action due to the presence of the spring handle which is peculiarly suited to the increased effectiveness with which fishhooks can be rapidly removed from fish. Certain other more specific objects of the invention will be obvious and appear hereinafter.

For a more complete understanding of the nature and scope of the present invention reference may now be had to the following detailed description of preferred embodiments thereof taken in connection with the accompanying drawings wherein:

FIG. 1 is a side elevational view, partly in section, of a fishhook remover constituting one preferred embodiment of the present invention;

FIG. 2 is a fragmentary side elevational view of the fishhook engaging end portion of another preferred embodiment of the invention;

FIG. 3 is a sectional view taken on line 3—3 of FIG. 2;

FIG. 4 is a view similar to FIG. 3 showing a modification of the fishhook engaging hook portion of a modification of the embodiment of the invention shown in FIGS. 2 and 3; and, FIG. 5 is a diagrammatic view which illustrates one of the important aspects of the operation of a fishhook remover made in accordance with the principles of the present invention.

Referring to the drawings, a fishhook remover is indicated generally at 5 in FIG. 1 with the tool itself being integrally formed from a single piece of wire stock so as to have a relatively straight shank 6, a fishhook engaging hook formation 7 on one end, and a spring handle 8 on the other end. The handle 8 comprises a multiplicity of turns of the wire with each turn engaging, or nearly engaging, the adjacent turns. If desired, a conventional handle grip 10 may be telescopically applied to the handle 8. The grip 10 is of a size such that it has a tight or press fit on the handle 8 so that it cannot be easily removed and will not fall off. The inner end of the handle 8 preferably has a tapered spring portion 9 which contributes to the desirable action of the tool and effectively defines a spring joint between the handle 8 and the shank 6.

It will be appreciated that the exact dimensions and proportions of parts are not critical. In fact the fishhook remover 5 may be in different sizes and weights for use with different sizes of fish.

The fishhook remover 5 may be economically formed on a mass production basis from wire stock by first automatically forming the coiled spring handle 8 on the free end of the wire as it is withdrawn from a supply reel or spool. Production machines are commercially available for tightly coiling the wire into adjacent turns to form the handle 8. After the handle 8 has been formed, the wire is cut off at a sufficient distance from the reduced or inner end of the handle 8 so as to provide the shank 6 and the hook portion 7. Preferably, the free end of the hook 7 is pointed as indicated at 11 although this is not necessary and the free end can be left blunt or rounded if desired. However, by having the point 11 formed thereon, the tool may occasionally be put to other uses such as a gaff hook. The hook 7 is readily formed on the severed end of the wire, either manually or automatically by means of a jig fixture made for this particular purpose.

Instead of having the hook 7 coplanar with the shank 6 as shown in FIG. 1, it may be bent so as to lie in a plane at approximately right angles to the shank 6. This modification is shown in FIGS. 2 and 3 wherein the shank is indicated at 6' and the hook portion at 7'. If desired, the hook formation 7' may be relatively open as shown in FIGS. 2 and 3 or it may be more nearly closed as illustrated in FIG. 4 wherein the shank portion is indicated at 6'' and the hook portion at 7''.

The spring handle 8 performs an essential function in the use of the fishhook remover 5 in that it permits the user to impart and vary or regulate the pressure which the fishhook engaging hook portion of the tool applies first to the line or leader suspending a fish on a hook and then to the hook itself. The nature of this action imparted by the spring 8 will be better understood from the following description of the manner in which the fishhook remover 5 is used.

A fisherman suspends a fish, whether dead or alive, by holding the line in one hand a few inches from the mouth of the fish (e.g. 10–15 inches). The hook formation 7 (7' or 7'') of the tool 5 is then applied to the line with the inside or bight portion of the hook engaging the line in such a way that a slight amount of pressure is applied to the line by the hook portion through the action of the spring handle 8. This action allows the hook formation 7 to be accurately and rapidly guided down the remainder of the line or leader until the fishhook itself is engaged. It will be understood that depending how the fish has been caught the hook may be engaging only a small part of the mouth of the fish or the fish may have actually swallowed the hook.

With slight pressure being continuously applied by the action of the handle portion 8 the hook formation 7 of the fishhook remover 5 is guided down the shank of the fishhook until it engages the base of the fishhook. At this point the fishhook remover 5 and the fish line are manipulated in such a way as to bring the barb of the fishhook against or close to the bight portion of the hook formation 7. This important interrelationship is illustrated in FIG. 5. It is important to note from FIG. 5 that with the hook formation 7 adjacent the point of the barb of the fishhook only the flesh of the fish trapped in the small space indicated at 12 offers any resistance to the easy withdrawal or removal of the hook. This resistance is readily overcome as the hook portion 7 is spring-pressed against the fishhook by imparting a short whip-like snap of the hands under the action of the spring handle 8. The small cross section of flesh in the space 12 is easily severed as this manipulation takes place and the fish drops off leaving the removed fishhook under its controlled engagement with the remover. It will be noted that the barb is continuously prevented from burying into any additional flesh since its point is maintained in proximity to or in engagement with the tool hook formation 7. Also the cross-sectional area of the space 12 may be minimized by rotating the fishhook to bring the barb closer to the hook 7 of the tool.

After just a few tries the user gets the "feel" of the proper spring action and becomes quite expert in using the fishhook remover 5 to readily remove a fish without either hand touching the fish itself.

Without the presence of the spring handle 8 it is quite difficult to bring about the removal of a fishhook from a caught fish because the appropriate or necessary action cannot be readily obtained.

Some users prefer to have the fishhook-engaging hook formation 7 of the tool turned at right angles to the shank as shown in FIGS. 2–4 instead of having it coplanar with the shank as in the tool 5 of FIG. 1. Furthermore, some users prefer to have the hook formations more closed than they are in the embodiments shown in FIGS. 1–3. A more closed relationship is shown in FIG. 4. However, in all the forms the same action is obtained from the spring handle 8.

It will be appreciated that the fishhook removers of the present invention may be formed of wire or plastic rod stock having desired physical properties. A preferred material is spring tempered drawn galvanized or stainless steel wire having a diameter between 0.035 to 0.25 inch with 0.135 inch preferred.

What is claimed as new is:

1. A fishhook remover integrally formed from a single piece of wire stock comprising a handle in the form of a multiplicity of turns of said wire stock, a rigid and straight shank portion coextensive with the handle, a spring between the handle and shank portion defining therebetween a spring joint, and a fishhook engaging hook formation on the free end of the shank portion and extending substantially perpendicular thereto, whereby a spring action between the handle and the shank and hook formation is defined by grasping and manipulating the handle.

2. The fishhook remover of claim 1, and a handle grip telescopically received over said handle.

3. The fishhook of claim 2, wherein the spring is tapered toward the shank portion.

4. The fishhook of claim 3, wherein the wire stock is spring tempered steel wire having a diameter of 0.035 to 0.25 inches.

* * * * *